(12) United States Patent
Stanwood et al.

(10) Patent No.: US 10,033,798 B2
(45) Date of Patent: Jul. 24, 2018

(54) SMART GRID PORTAL ELECTION

(71) Applicant: Taiwan Semiconductor Manufacturing Co., Ltd., Hsinchu (TW)

(72) Inventors: Kenneth L. Stanwood, Vista, CA (US); Ahmed ElArabawy, San Diego, CA (US); David Gell, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 288 days.

(21) Appl. No.: 14/177,506

(22) Filed: Feb. 11, 2014

(65) Prior Publication Data
US 2014/0237080 A1    Aug. 21, 2014

Related U.S. Application Data

(60) Provisional application No. 61/765,665, filed on Feb. 15, 2013.

(51) Int. Cl.
*G06F 15/16* (2006.01)
*H04L 29/08* (2006.01)
(Continued)

(52) U.S. Cl.
CPC .............. *H04L 67/10* (2013.01); *H04W 40/22* (2013.01); *H04W 4/70* (2018.02); *H04W 40/24* (2013.01); *H04W 40/32* (2013.01); *H04W 84/22* (2013.01); *H04W 88/04* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01);
(Continued)

(58) Field of Classification Search
None
See application file for complete search history.

(56) References Cited

U.S. PATENT DOCUMENTS

| | | | |
|---|---|---|---|
| 2009/0201898 A1* | 8/2009 | Gong | H04L 1/0007 370/338 |
| 2010/0008256 A1* | 1/2010 | Chebbo | H04W 84/18 370/254 |

(Continued)

OTHER PUBLICATIONS

International Search Report and Written Opinion for related PCT Application No. PCT/US2014/015777, dated May 2, 2014, in 14 pages.

*Primary Examiner* — Brian Whipple
*Assistant Examiner* — Anthony T Rotolo
(74) *Attorney, Agent, or Firm* — JCIPRNET

(57) ABSTRACT

A smart node in a local area network, the smart node comprising a first transceiver module for communicating with a plurality of other nodes in the local area network, a second transceiver module for communicating with an access node in a wide area network, and a processor that is configured to establish a connection with at least one neighboring node in the local area network, determine a portal candidate score for the smart node based on at least one node characteristic value, determine if the smart node is acceptable to act as a portal between the local area network and the wide area network, and connect, in the case that the smart node is acceptable to act as a portal, to the access node in the wide area network.

42 Claims, 6 Drawing Sheets

(51) Int. Cl.
*H04W 40/22* (2009.01)
*H04W 40/24* (2009.01)
*H04W 40/32* (2009.01)
*H04W 84/22* (2009.01)
*H04W 88/04* (2009.01)
*H04W 4/70* (2018.01)

(52) U.S. Cl.
CPC ............ *Y02D 70/162* (2018.01); *Y02D 70/21* (2018.01); *Y02D 70/22* (2018.01); *Y02D 70/39* (2018.01)

(56) References Cited

U.S. PATENT DOCUMENTS

| | | | |
|---|---|---|---|
| 2010/0008286 A1 | 1/2010 | Abedi et al. | |
| 2013/0003654 A1 | 1/2013 | Iyer et al. | |
| 2013/0021956 A1* | 1/2013 | Shuey | H04W 40/22 370/311 |
| 2014/0036683 A1* | 2/2014 | Krishnamurthy | H04W 40/10 370/236 |

* cited by examiner

SMART GRID PORTAL ELECTION

CROSS-REFERENCE TO RELATED APPLICATIONS

This application claims the benefit of priority to U.S. Provisional Patent Application No. 61/765,665, filed Feb. 15, 2013, and entitled "System and Method for Smart Grid Portal Election," which is incorporated herein by reference.

BACKGROUND

The present invention generally relates to the field of smart grids, smart meters, industrial control, advanced metering infrastructure networks, communications networks, mesh networks, access networks, and machine to machine (M2M) communications.

A smart grid network is often based on multiple instances of multi-hop mesh short range local area networks (LAN), such as the IEEE 802.11s mesh extension to the IEEE 802.11 standard or proprietary protocols, that collect data from a number of smart meters and forward the data towards a "collector". The collector is typically an offload point or portal that provides connectivity to forward the data from the smart meters in the LAN to the utility operator through a longer range wide area network (WAN), such as a proprietary WAN or a wireless network operated by, for instance, a mobile network operator (MNO). The collector may also receive control and data from the utility operator via the WAN and forward the control and data to the recipient meter or meters through the LAN. This architecture of a WAN providing connectivity to one or more mesh LANs comprised of one or more meters enables smart grid connectivity even though the meters may be disadvantageously located with respect to WAN connectivity.

A collector is typically specifically designed and provisioned for acting as a portal between the LAN and the WAN. A collector could be, for instance, an IEEE 802.11s mesh portal or a portal of a proprietary mesh technology. Although the Zigbee communication protocol is typically used for indoor mesh, for instance using the Home plug Smart Energy Profile, both Zigbee and Bluetooth could alternatively be used to provide the mesh LAN. Relays may be used to reach the collector.

While the meters may use mesh to self-organize and heal the mesh LAN, repeaters and collectors are strategically placed in planned locations advantageous to WAN connectivity with an expectation of acting as a portal for certain sets of meters in a geographic area. While some smart grid systems use mesh techniques to provide connectivity between repeaters and collectors, thereby increasing the ability of the smart grid network to self-heal upon the outage on a repeater or collector, this method of achieving self-healing capability either requires a further capital expenditure for special purpose repeater and collector equipment and sites or is not robust due to a sparse deployment of repeaters and collectors, which can be a single point of failure, relative to meters. Additionally, adding more collectors may cause more load or overhead on the WAN which can be undesirable.

There is a deficiency in the self-healing characteristics, self-organizing characteristics, and robustness of typical smart grid LAN connectivity to the WAN that results in additional load and overhead on the WAN. Similar deficiencies exist in body access networks, sensor networks, industrial control systems, and related machine to machine applications as for the aforementioned smart grid systems.

SUMMARY

In one aspect, a smart node is provided in a local area network, the smart node comprising a first transceiver module for communicating with a plurality of other nodes in the local area network, a second transceiver module for communicating with an access node in a wide area network, and a processor that is configured to establish a connection with at least one neighboring node in the local area network, determine a portal candidate score for the smart node based on at least one node characteristic value, determine if the smart node is acceptable to act as a portal between the local area network and the wide area network, and connect, in the case that the smart node is acceptable to act as a portal, to the access node in the wide area network.

In another aspect, a method is provided for operating a smart node in a local area network, the method comprising establishing a connection between the smart node and at least one neighboring node in the local area network via a first transceiver module, determining a portal candidate score for the smart node based on at least one node characteristic value associated with the smart node, determining if the smart node is acceptable to act as a portal between the local area network and a wide area network, and connecting, in the case that the smart node is acceptable to act as a portal, to an access node in the wide area network via a second transceiver module.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Devices, methods and systems are provided for operating a smart node in a local area network.

In aspects of the invention, the self-healing characteristics, self-organizing characteristics, and robustness of the smart grid LAN connectivity to the WAN are improved by having the devices that act as collectors, which are the devices that act as a portal between the LAN and the WAN, not be special purpose devices. Instead, according to aspects of the invention, a plurality of smart meters are made capable of being collectors thereby increasing, relative to prior art systems, the number of devices that are capable of connecting as a portal to the WAN infrastructure. This increases network robustness by reducing or eliminating dependence on specialized collectors which can be a point of failure. According to aspects, devices acting as collectors do not need specially constructed or chosen sites, so that the smart grid network requires a minimum of planning, or no planning, of the geographic placement of the collectors.

Further, to decrease signaling load on WAN infrastructure, the smart grid network according to aspects of the invention is designed to minimize the number devices that are directly connected as a portal to the WAN. In such a network, there are more devices that are capable of being a collector or portal than the number of devices that actually act as a collector at a given time. In certain aspects, a method of choosing which smart meters will act as collectors is provided.

While aspects of the invention are described in terms of a smart grid system, one skilled in the art would understand that the disclosed methods, systems and devices can be adapted for other sensor networks, industrial control systems, and related machine-to-machine applications.

Figure 1:
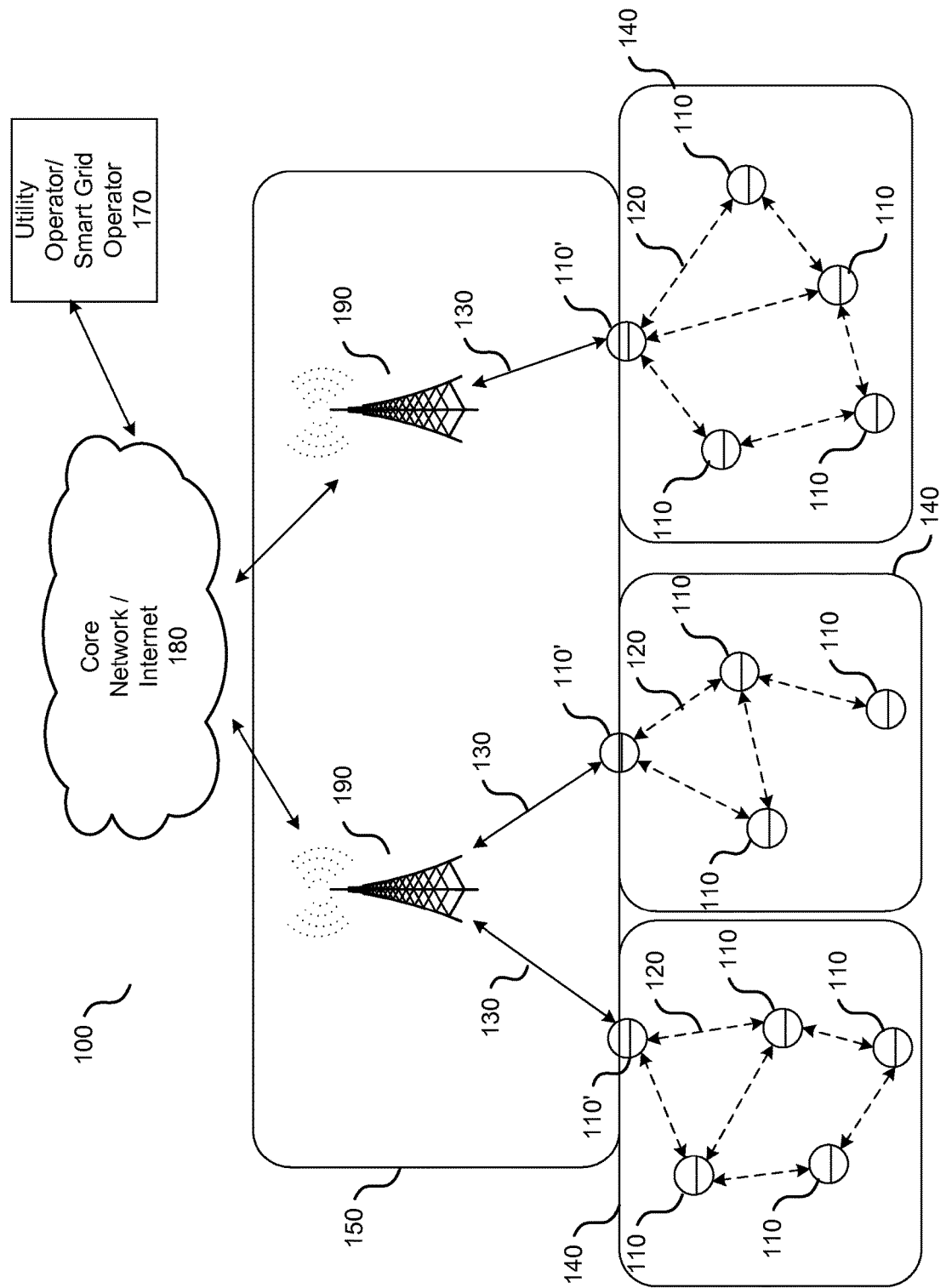
FIG. 1 is a block diagram of a smart grid communication network in which devices, systems and methods disclosed herein may be implemented in accordance with aspects of the invention.

FIG. 1 depicts an improved smart grid network 100 according to aspects of the invention. Smart grid network 100 provides meter data to a smart grid operator 170 and provides control to meters 110 from the smart grid operator. Additionally, smart grid network 100 may be used to pass other types of information between meters 110 and smart grid operator 170, such as meter authentication information and other security messages, management messages including faults, configuration, accounting and performance information, and meter firmware updates. In the exemplary aspect shown in FIG. 1, smart grid network 100 includes four primary components, LANs 140, access WANs 150, a core network or the Internet 180, and the Utility Operator/Smart Grid Operator 170.

Meters 110 within the smart grid network 100 organize themselves into LANs 140 and thereby communicate with each other over links 120 via technology suited to LANs. Links 120 may use technology suited for shorter range communication than needed for WAN 150. This technology may be proprietary or may be based on a standard such as IEEE 802.11, ZigBee, Bluetooth, or Ultra-Wideband (UWB). In aspects of the invention, the LANs 140 communicate via a mesh protocol so that meters may discover each other and establish and maintain communications. Such a mesh protocol may be, for example, the IEEE 802.11s mesh protocol described in "IEEE Std 802.11-2012, IEEE Standard for Information technology—Telecommunications and information exchange between systems—Local and metropolitan area network—Specific requirements—Part 11: Wireless LAN Medium Access Control (MAC) and Physical Layer (PHY) specifications", Chapter 13 "MLME mesh procedures", pages 1352-1441.

The meters 110 elect a meter 110' to act as a collector, i.e., a portal between the LAN 140 and the WAN 150, as will be described below with reference to FIGS. 2A and 2B. The meter 110' that acts as a collector provides connectivity to the WAN 150 for the members of the LAN 140 by establishing a communication link 130 with an access node 190 in WAN 150. In order to reduce smart grid operator equipment and site related expenses, the access node 190 and WAN 150 may be an existing wireless infrastructure. The access node 190 may be, for example, a mobile WiMAX base station, a global system for mobile (GSM) wireless base transceiver station (BTS), a Universal Mobile Telecommunications System (UMTS) NodeB, a Long Term Evolution (LTE) evolved Node B (eNB or eNodeB), or a WiFi Access Point (AP). The WAN 150 may be the corresponding mobile wireless access network operated by a MNO, Wireless Internet Service Provider (WISP) or smart grid operator (SGO).

In an aspect, the connectivity from the WAN 150 to utility operator/SGO 170 may be via a core network 180 which may include one or more third-party network segments or the public Internet.

Figure 2A:
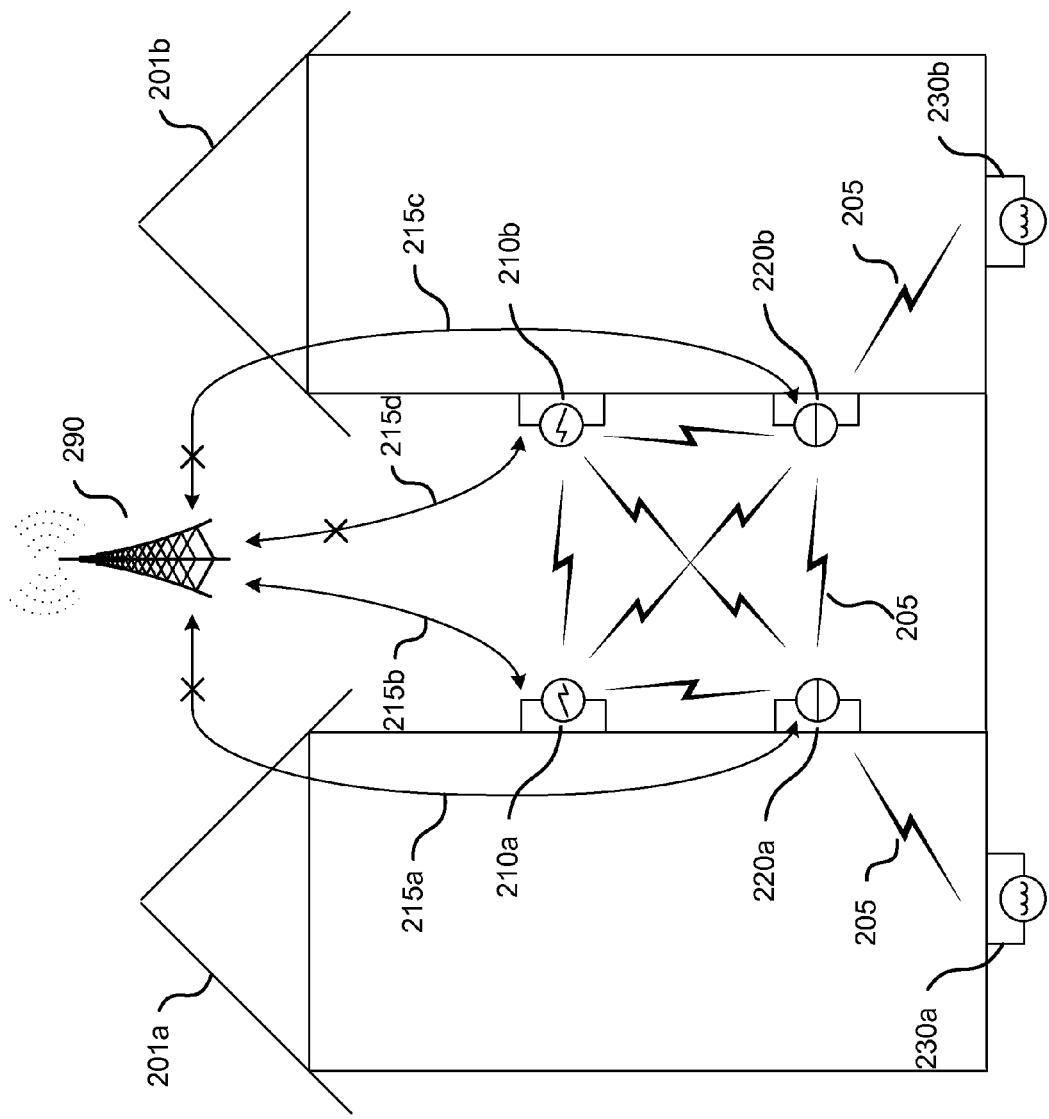
FIG. 2A is a block diagram of a mesh network of meters in accordance with aspects of the invention.

FIG. 2A depicts a plurality of meters that form a close range mesh network according to aspects of the invention. The close range mesh network, such as LAN 140 of FIG. 1, accesses an access node 290, which may be an instance of access node 190 of FIG. 1, in order to provide connectivity through a WAN, such as WAN 150 of FIG. 1, to forward meter data to a smart grid operator and to provide control and data to meters from the smart grid operator.

Even though access node 290 in FIG. 2A is depicted as being outside of buildings (e.g., houses, multi-tenant units, or commercial buildings) 201a and 201b, one skilled in the art would understand that access node 290 could alternatively be inside of building 201a or building 201b, such as for example an LTE home eNodeB (HeNodeB), other cellular technology femtocell, or a WiFi access point connecting to the utility/smart grid operator's facilities via the Internet. In such situations, core network 180 may include the connectivity from the building to the Internet, such as a hybrid fiber-coax (HFC) cable modem network or a digital subscriber loop (DSL) network.

By way of example, each building 201a and 201b in FIG. 2A has an electric meter 210, a gas meter 220, and a water meter 230. One skilled in the art would understand that other configurations with fewer, more, or different meters are possible, including meters located inside of buildings 201a or 201b. Even in an aspect in which all meters 210, 220, and 230 are capable of directly communicating with access node 290, it is desirable to limit the number of meters that are actually in direct communication with the access node 290. For instance, a large amount of direct connections between meters and the access node 290 may create excessive communication signaling or protocol overhead on the WAN, especially in situations where meter reading or measurement collection times coincide or when there is a need to reconnect all meters after some event such as a power outage. Some meters may have better signal quality than others for communicating with access node 290, allowing them to use more efficient modulation and coding, thereby saving communication system resources. Some meters may be battery powered and may wish to reduce battery consumption by not enabling a high power transmit path to access node 290 unless no low power alternative exists, such as the use of close range communications to a neighboring meter. Some meters may not be equipped with high powered transceivers capable of communicating directly with access node 290.

In certain aspects, in order to reduce the number of direct connections to access node 290, groups of meters 210, 220, and 230 that are in sufficiently close proximity communicate with each other via communication links 205 and form a close range network, such as LAN 140 of FIG. 1, and each of the groups of meters 210, 220 and 230 elect at least one meter to act as a portal. The meter elected as a portal collects data from other meters and acts as a portal by forwarding collected data to the smart grid operator's facilities via access node 290. The collected data may be forwarded when received or the collected data may be held and then forwarded at an opportune time. In an aspect, data from multiple sources may be aggregated prior to forwarding to the smart grid operator's facilities. Such an aggregation may include collecting and storing one or more data packets from one or more sources and forwarding them aggregated in a single burst or aggregated in a single packet. Aggregation may include combining the data from multiple sources into a reduced set of data, for instance, combining multiple power failure messages into a single group power failure message.

In the reverse direction, the meter that is elected as a portal may receive information from the SGO facility via access node 290 and distribute it to other meters. To enable communication between meters and for the purpose of electing a portal, the meters 210, 220, and 230 are equipped with a common communication capability for short range communication over links 205.

In an aspect, the election of the portal takes into consideration a number of characteristics of each of the meters including but not limited to which meters are designed with the capability to communicate with access node 290, the signal quality between meters and access node 290, whether a meter is battery powered or has wired power, the number of other meters that a meter is in communication with over a maximum number of hops, the combined latency of hops, and whether a meter has access to an alternative access node 290, possibly of a different air interface technology, such as access to, for instance, a WiFi AP or an LTE HeNodeB. Based on one or more of these characteristics, or other meter characteristics, a meter may be chosen to act as portal using any of a number of algorithms such as a decision tree or the calculation of a cost function or score.

By way of example, electric meters 210a and 210b may be capable of communication with access node 290 and may be powered by wired electricity, gas meters 220a and 220b may be capable of communicating with access node 290 and may be battery powered, and water meters 230a and 230b may not be capable of communication with access node 290 and may be battery powered. Table 1 gives a score function for such an example, wherein the score function is derived from a set of meter characteristics and may provide a score to elect a meter to act as the portal to the access network.

TABLE 1

| Meter | Designed to communicate with access node | Wired or battery powered, battery level | Signal Quality | Number of other meters within 2 hops | Product = portal score |
|---|---|---|---|---|---|
| 210a | 1 | 10 | 10 | 5 | 500 |
| 210b | 1 | 10 | 9 | 5 | 450 |
| 220a | 1 | 1 | 7 | 5 | 35 |
| 220b | 1 | 1 | 7 | 5 | 35 |
| 230a | 0 | 1 | 0 | 4 | 0 |
| 230b | 0 | 1 | 0 | 4 | 0 |

In this example, a meter that is designed to be capable of communicating with access node 290 receives a value of 1 for that characteristic and a value of 0 if it is not capable of communicating with access node 290. Since the portal score function is created by multiplying the characteristic values, this has the effect of eliminating for consideration as portal any meter that is not capable of acting as a portal communicating with access node 290. In this example, the characteristic regarding power source is given a value of 10 if the meter has wired power and a value of 1 if the meter is battery powered. This has the effect of providing a preference for meters that have wired power to act as portal. Battery charge or power level is not considered in this particular example, but could be used to create richer weights. One skilled in the art would understand that other values for this characteristic could be possible such as the use of additional values that represent wired power with battery backup, battery power with solar recharging, or remaining battery power level. The characteristic regarding signal quality is given a value on a scale of 0-10 in this example with meter 210a exhibiting the best signal quality. The signal quality characteristic's value may be calculated, for example, based on signal quality of the signal from access node 290 that is received by the meter, such as for instance signal to noise ratio (SNR), carrier to interference plus noise ratio (CINR), received signal strength indication (RSSI) or any one or combination of such signal metrics as would be known to one skilled in the art. Alternatively, in other aspects, the smart meter may connect with the WAN for the purpose of allowing calculation of a signal quality characteristic based on signal quality of the signal from the meter that is received by access node 290. The calculation of this characteristic value may be further modified by a function of the maximum uplink transmit power of a meter which may be different for different devices. For instance, battery powered devices may have a lower maximum transmit power than wired power devices which may limit the achievable receive SNR at access node 290 and, therefore, signal quality in the transmit direction. Since the signal quality of meters incapable of communicating with access node 290 is given the value 0 in this example, the values for signal quality and communication capability could alternatively be combined into a single characteristic score. In the example shown in FIG. 2A, all electric and gas meters are capable of communicating with all other meters over at most two hops, but the two water meters cannot reach each other in two hops.

If the characteristics values are multiplied in the example, meter 210a has the highest score and is elected to act as a portal for meters 210b, 220a, 220b, 230a, and 230b to be connected to the smart grid operator's facilities. Meter 210a communicates with access node 290 via communication link 215b. Meters 210b, 220a, and 220b disable or otherwise refrain from using communication links 215d, 215a, and 215c, respectively, to communicate with access node 290.

In addition to the data collection, aggregation, and distribution performed by the meter elected portal, intermediate nodes in the smart grid may also perform data collection, aggregation, and distribution. For instance, in the example of FIG. 2A, gas meter 220a may collect information from water meter 230a and forward it to electric meter 210a for forwarding to the smart grid operator.

Figure 2B:
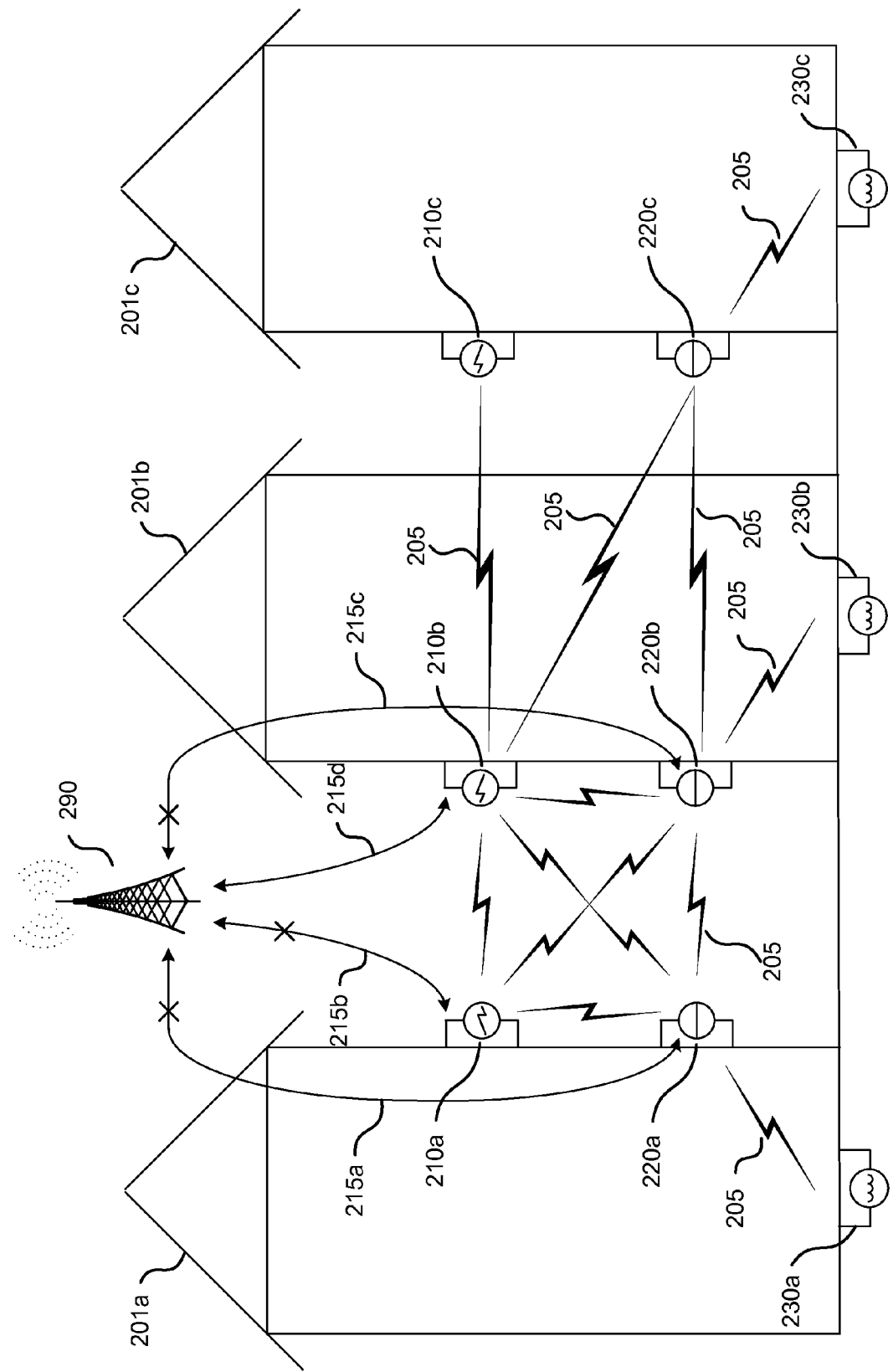
FIG. 2B is a block diagram of a mesh network of meters in accordance with further aspects of the invention.

FIG. 2B shows an example extension of the smart grid network of FIG. 2A, in accordance with an aspect of the invention. An additional building 201c now has an electric meter 210c, a gas meter 220c, and a water meter 230c capable of participating in the smart grid. In this example, electric meter 210c has wired power and is designed to be capable of communicating with access node 290, but the communication path is poor. It can however communicate with electric meter 210b of building 201b via short range communications. Gas meter 220c has battery power and is designed to be capable of communicating with access node 290, but the communication path is too poor for such communication in this example. Gas meter 220c can however communicate with electric meter 210b and gas meter 220b of building 201b via short range communications. Water meter 230c is not designed to be capable of communicating with access node 290 and can only communicate with gas meter 220c via short range communications 205.

Table 2 shows the example cost function expanded due to the addition of the new meters to the smart grid.

TABLE 2

| Meter | Designed to communicate with access node | Wired or battery powered, battery level | Signal Quality | Number of other meters within 2 hops | Product = portal score |
|---|---|---|---|---|---|
| 210a | 1 | 10 | 10 | 7 | 700 |
| 210b | 1 | 10 | 9 | 8 | 720 |
| 210c | 1 | 10 | 1 | 4 | 40 |
| 220a | 1 | 1 | 7 | 7 | 49 |
| 220b | 1 | 1 | 7 | 8 | 56 |
| 220c | 1 | 1 | 1 | 6 | 6 |
| 230a | 0 | 1 | 0 | 4 | 0 |
| 230b | 0 | 1 | 0 | 5 | 0 |
| 230c | 0 | 1 | 0 | 3 | 0 |

In this extended example, electric meter 210b now has the highest score by virtue of its relatively high signal strength and its ability to collect data from more other meters within two hops and is therefore elected as the portal to access node 290. Electric meter 210a discontinues communication with access node 290 over communication link 215b and electric meter 210b activates communication with access node 290 over communication link 215d.

One skilled in the art will understand that more or fewer meter characteristics can be used to elect a portal, that the characteristics may be scaled relative to each other to give different characteristics greater or lesser importance, that each characteristic may have more or fewer values that it can take, and that the characteristics may themselves be composites of other, finer characteristics (e.g. signal quality may be a function of receive SNR and maximum transmit power).

Figure 3:
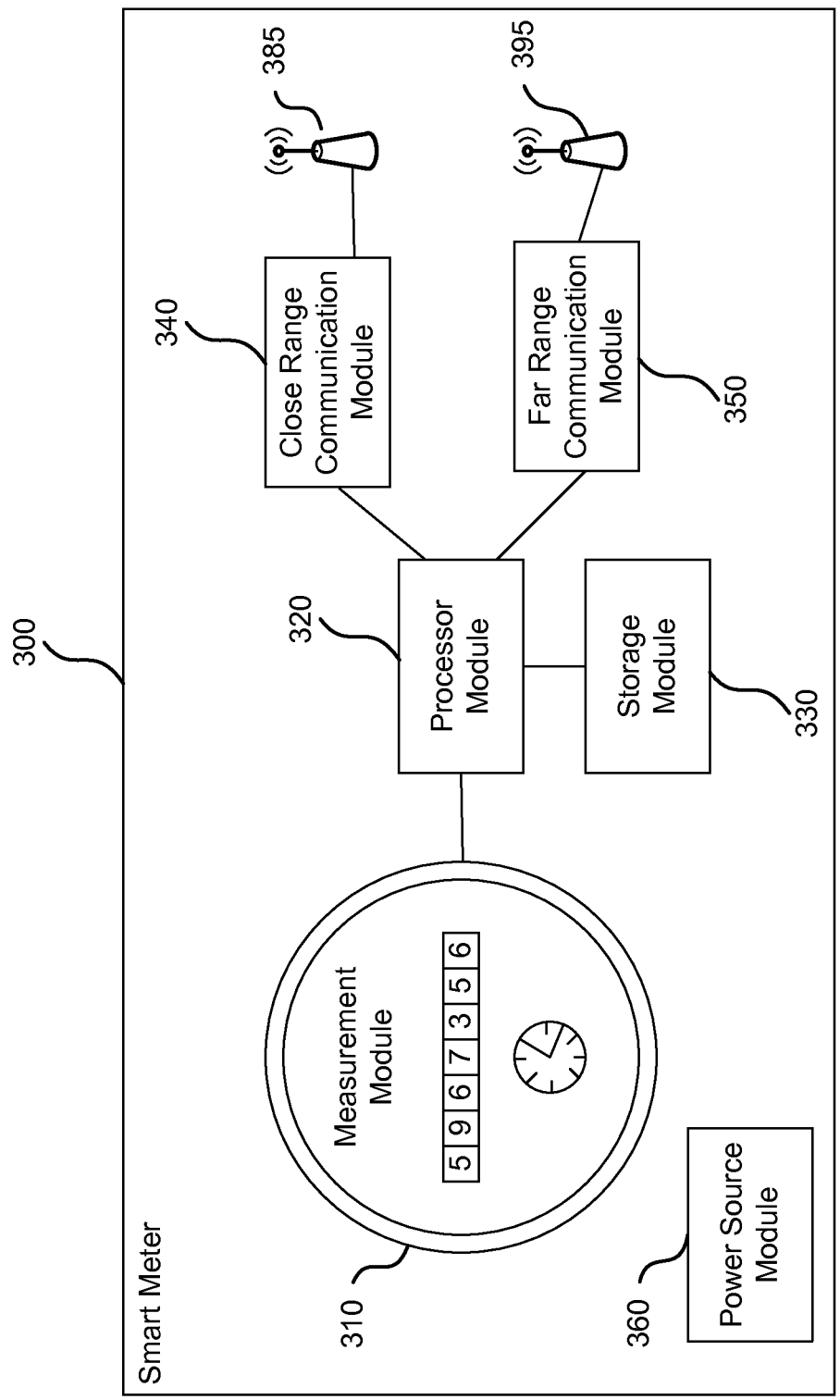
FIG. 3 is a block diagram of a smart meter in accordance with aspects of the invention.

FIG. 3 shows a smart meter 300 that can be used in a smart grid network as described herein, according to aspects of the invention. In the example of FIG. 3, smart meter 300 may be an instance of meter 110 of FIG. 1, or meters 210, 220, or 230 of FIGS. 1A and 1B. The exemplary smart meter 300 of FIG. 3 contains a measurement module 310 designed to measure the consumption of a resource or the state of a sensor or actuator. For instance, measurement module 310 of smart meter 300 may be able to measure the consumption of electricity, natural gas, propane, water, or some other resource. Alternatively, measurement module 310 of smart meter 300 may measure temperature, liquid flow, voltage, light or some other measurable environmental parameter. Alternatively, measurement module 310 of smart meter 300 may measure or observe the state of relays, valves, or other devices. In an aspect, measurement module 310 measures the consumption of electricity. In an alternative aspect, measurement module 310 measures a combustible gas or liquid such as natural gas, heating oil, propane, or methane. In an alternative aspect, measurement module 310 measures the consumption of water. Measurement module 310 may be further designed to measure the production of a resource in addition to the consumption of the resource. For example, an electric meter may include a measurement module 310 that can measure both the consumption and the production of electricity if attached to a building that has a solar, wind, or other power source in addition to receiving power from the utility service. According to another aspect, in addition to, or instead of the collection of data, devices in the network may receive commands and take actions on those commands. For example, a smart meter may accept a command to stop, start, or reduce the flow of resources. In other aspects, a device in the network may have no metering capabilities and may provide only actions in response to commands, such as changing the state of a relay, valve, temperature control, lighting control, etc. One skilled in the art will understand that, while the present invention was described with respect to smart meters in a smart grid system, numerous other industrial control or monitoring applications are possible.

Smart meter 300 contains a processor module 320 coupled to the measurement module 310, a storage module 330, and a close range communication module 340. In some aspects, processor 320 is also coupled to a far range communication module 350.

Processor module 320 accepts readings or other measurements from measurement module 310 for forwarding to the utility operator. Measurements may be stored in storage module 330 which may also store executable instructions for processor module 320. Processor module 320 may receive readings or measurements from other smart meters via close range communication module 340. These readings or measurements may be stored in storage module 330 for later forwarding to the utility operator. Processor module 320 may collect and combine, or aggregate, measurements from measurement module 310 with the measurements from other meters prior to forwarding the measurements to the utility operator. If smart meter 300 is not the smart meter that is elected as a portal, it communicates the measurements to the operator by using close range communication module 340 to forward the measurements to the portal or the next smart meter closer to the portal. If smart meter 300 is the smart meter that is elected as a portal, it forwards the measurements to the operator by using far range communication module 350 to transmit the measurements to access network infrastructure such as access node 290 of FIG. 2A. If smart meter 300 is not the portal, it may also receive, via close range communication module 340, commands or other control information forwarded to it by other smart meters. If smart meter 300 is the portal, it may also receive, via far range communication module 350, commands or other control information transmitted to it by the utility operator.

Close range communication module 340 is used by smart meter 300 to communicate with other smart meters, forming a close range network. Close range communication module 340 is connected to one or more antennas 385 and implements a wireless protocol such as, for example, IEEE 802.11s mesh, UWB, or Bluetooth. If smart meter 300 contains a far range communication module 350, the far range communication module 350 is used to communicate through an access network, such as an LTE network, by connecting to an access node of the access network, e.g. LTE eNodeB, GSM BTS, etc., as depicted by access node 290 of FIG. 2A. In an aspect, communication using far range communication module 350 may be limited to times when smart meter 300 has been elected as a portal. In an aspect, if smart meter 300 contains a far range communication module 350, the far range communication module 350 may be connected to one or more antennas 395 and may implement a wireless protocol such as LTE, GSM, UMTS, WiMAX, or IEEE 802.11a. If the transmitting frequencies allow, close range communication module 340 and far range communication module 350 may share antennas. Alternatively, close range communication module 340 and far range communication module 350 may implement the same wireless protocol. In such a case, wireless communication via close range communication module 340 may use a different radio frequency channel than wireless communication via far range communication module 350.

Smart meter 300 contains power source module 360 which provides power for the processing, storage, and communication function of smart meter 300. Power source module 360 may provide wired power, battery power, wired power with battery backup, or battery power with solar recharging. Power source module 360 may be coupled to processor module 320, for instance, to allow reporting of a low battery charge condition in a battery powered smart meter 300.

A smart meter 300 which has been elected as a portal may lose communications connectivity with the access network due to, for instance, a malfunction in far range communication module 350 or in its associated one or more antennas 395, or due to an obstruction such as a disadvantageously parked truck blocking the communication signal. In such a case, smart meter 300 may still be capable of communication with other smart meters, for instance via close range communication module 340, and may inform them of the loss of portal capability, triggering them to elect a new smart meter to act as the portal. In an alternative aspect, the smart meter 300 may have stored previous meter characteristics scoring results and may directly request the smart meter with the second best score to take over as portal. The smart meter elected to act as the new portal activates its far range communication module 350 for communication with the access network.

In some situations, a smart meter 300 that was not elected to act as the portal may lose communication with the smart meter that was elected as a portal. If smart meter 300 can communicate with other smart meters, for instance via close range communication module 340, it may inform them of the loss of connectivity to the smart meter that was acting as portal. If other smart meters can still communicate with the portal smart meter, they may merely reorganize the close range network to provide indirect connectivity for smart meter 300, as is commonly done in mesh networks. If, however, none of the smart meters can communicate with the smart meter acting as the portal, they may elect a new portal. According to an aspect, the scoring may be performed again, or the results of the previous scoring may be used if stored. Once a new portal is elected, the loss of the previous portal may be reported to the smart grid operator. If smart meter 300 can no longer communicate with the portal smart meter or any other smart meters, for instance in the case of a malfunction of the close range communication module 340 of smart meter 300, or a malfunction of the associated one or more antennas 385, and if smart meter 300 is designed to be capable of being a portal (i.e. it contains far range communication module 350), then smart meter 300 may view itself as a close range network of a single meter, elect itself as portal for that close range network, and then enable far range communication module 350 to provide direct connectivity to the access network for itself. Alternatively, if a smart meter 300 possesses the capability to communicate using close range communication module 340 but can no longer reach any other meters in its close range network, it may attempt to join other nearby mesh networks.

In an aspect, smart meter 300 may be designed with power source module 360 providing wired power as a primary power source and battery backup as a secondary power source. In such an aspect, the battery backup my not provide sufficient power for prolonged operation. In particular, the operation of smart meter 300 as a portal transmitting via far range communication module 350 may be limited in duration. In a power outage situation, many smart meters may lose wired power. Conserving battery power in such a situation is important. If the close range network can still reach a smart meter with wired power, a smart meter with wired power may be elected to act as the portal. If all smart meters within communication range have lost wired power, numerous actions may be taken to decrease power consumption. Power failure messages from the various affected smart meters may be compressed into a single power failure message, such as a message that includes the portal's identification and a count of neighbors without power. This has the additional benefit of reducing the load on the access network. To share the cost on battery life of acting as portal, smart meters may take turns acting as the portal by periodically electing a new portal based on time periods or based upon a meter characteristic of estimated remaining battery life. In an alternative aspect, smart meters collect meter readings or measurements and store them locally, for instance in non-volatile memory in storage module 330, such that the frequency of transmissions may be reduced or that transmission may be halted until wired power is restored.

Figure 4:
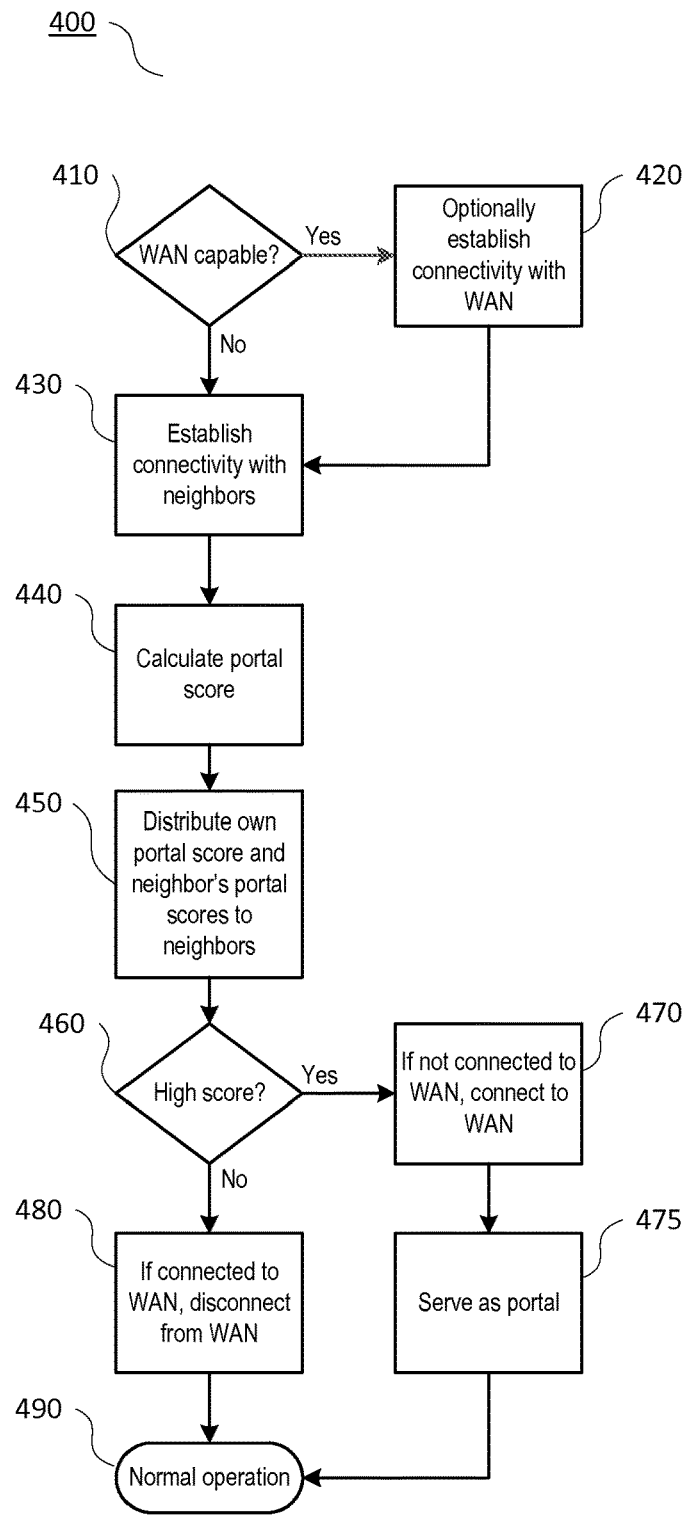
FIG. 4 is a flowchart depicting the connection of a node in a smart grid network in accordance with aspects of the invention.

FIG. 4 is a flowchart 400 describing an exemplary method of operating a node in a smart grid network, such as smart meter 300 of FIG. 3, for the purpose of connecting the smart meter as a member of a smart grid according to an aspect of the invention. At step 410, the smart meter determines whether it is capable of connecting to the WAN, that is to say, capable of being a portal. If the smart meter is capable of being a portal, it optionally proceeds to step 420 where it connects to the WAN. This step may be deferred to step 470 as described later. In any case, the method proceeds to step 430 where the smart meter establishes communications with its neighboring smart meters. This is performed using the protocols of the chosen LAN technology, such as IEEE 802.11 mesh for example. At step 440, the smart meter calculates its portal score, for instance, using a cost function that is embedded in the smart meter or that was downloaded via the WAN. This may, for instance, use criteria and a cost function such as described above with respect to Table 1. In an alternative aspect, the relevant metrics of the smart meter(s) are forwarded to a central node which calculates the portal scores to ensure normalization, for instance in the case of heterogeneous smart meters such as electric meters and water meters in the same network. The central node may be either in the close range network, for example an already elected portal, or reachable via the WAN, such as a server in the utility operator's facilities.

After the smart meter score is calculated, the smart meter distributes its portal score to its neighbors in step 450. It may also forward portal scores from its neighbors to other of its neighbors to facilitate operation in multi-hop LANs. In an alternative aspect, a central node distributes the portal scores through the LAN. At step 460, the smart meter determines whether the score is the high score of several smart meter scores. If it was the high score, the process proceeds to step 470 in which the smart meter connects to the WAN, if not already connected in step 420. The smart meter serves as a portal (step 475) and the process proceeds to normal operation in step 490. If at step 460, the smart meter did not have the high portal score, the process proceeds to step 480 in which it disconnects from the WAN, if it already connected to the WAN, and then proceeds to normal operation in step 490. In an aspect, a smart meter which is not elected as a portal sends information about the smart meter which has been elected as a portal to its meshing protocol stack in order to optimize the mesh path to the portal. For example, information about an elected portal's internet protocol (IP)

or media access control (MAC) address may be sent to a smart meter's meshing protocol stack to improve packet routing.

In an alternative aspect, decision criteria may be used at step 460 which allows multiple smart meters to be elected as portals. For instance, a smart meter may act as portal if its portal score is above a threshold, or it may act as a portal if it has one of the n highest portal scores rather than only if it has the highest portal score. Multiple smart meters may be elected to be portals to increase the diversity of paths to the WAN, increasing robustness. Multiple smart meters may be elected to keep the number of LAN hops or the combined latency of LAN hops below a threshold.

Figure 5:
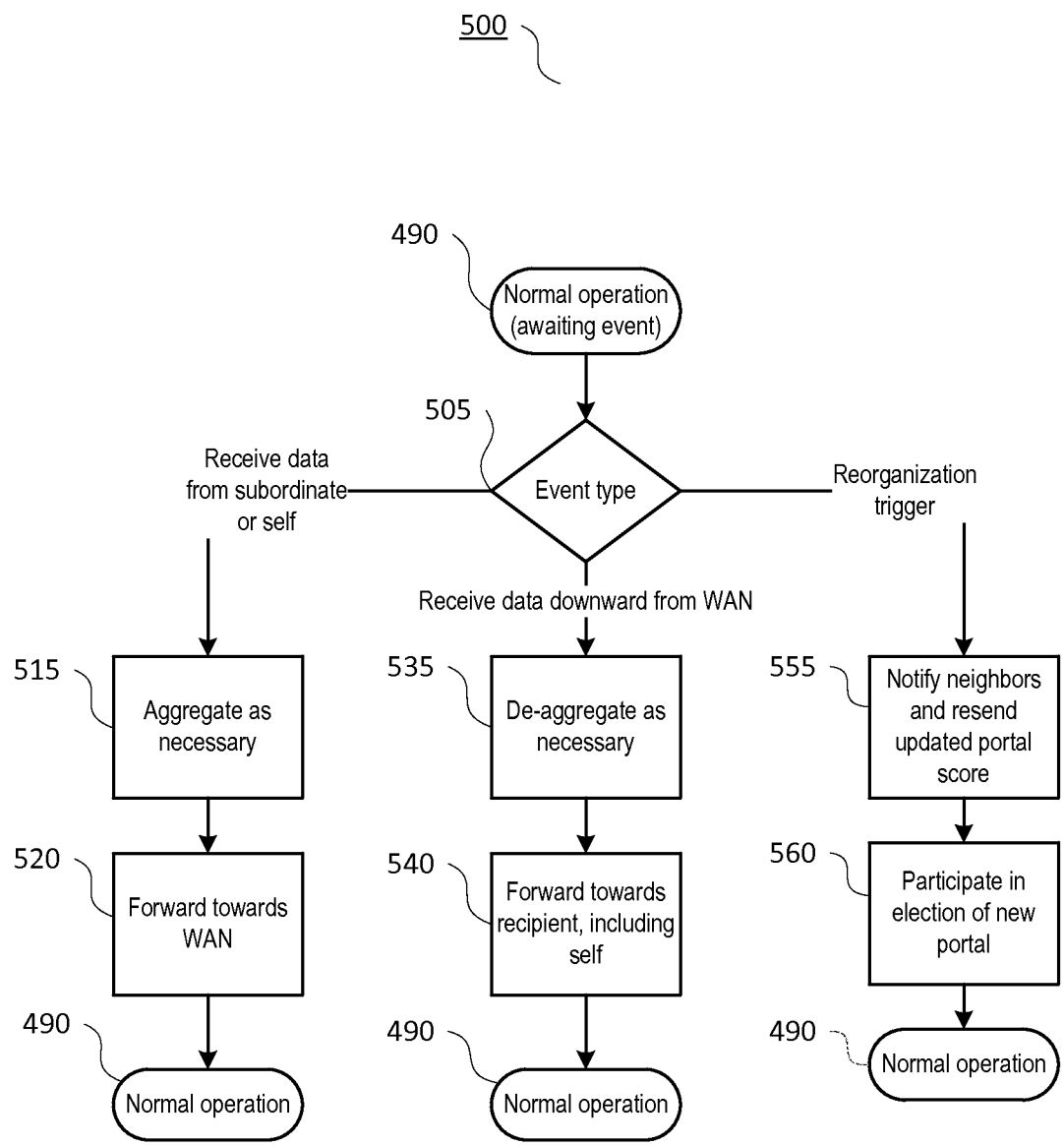
FIG. 5 is a flowchart depicting the operation of a node in a smart grid network in accordance with aspects of the invention.

FIG. 5 is a flowchart 500 describing an exemplary method of operating a node in a smart grid network, such as smart meter 300 of FIG. 3, for normal operation as a member of a smart grid according to an aspect. The method is used by smart meters that have been elected portal as well as those that have not been elected portal. While the mechanism used by a smart meter acting as a portal for sending and receiving data to and from the WAN may be different than the mechanisms for sending and receiving data within the LAN, in both cases a device may receive or generate data that must be sent towards the WAN and the device may receive data that must be forwarded to devices for which it provides a node in the path to the WAN.

In step 490 (from FIG. 4), the smart meter is awaiting various events that cause it to perform an associated action. At step 505, an event is detected and the method proceeds based on the type of event. If the event detected in step 505 is the generation of data locally, such as a periodic reading of a meter or the receipt of data from a subordinate device, that is to say a device for which the smart meter has the task of forwarding data towards the WAN, the method moves to step 515. At step 515, aggregation into transmission bursts, aggregation into a smaller number of packets, and/or any other processing is performed. For instance, the data may be stored in a storage module such as storage module 330 and processed in processor module 320 of FIG. 3. When the data is ready it is forwarded towards the WAN at step 520, after which the method returns to normal operation 490 and awaits another event. If the device performing the method has been elected as a portal, step 520 is accomplished by directly communicating the data to an access node of the WAN, such as access nodes 190 or 290 of FIG. 1 and FIG. 2, respectively. This may be accomplished, for instance, using a transceiver such as far range communication module 350 of FIG. 5. If the device performing the method has not been elected as a portal, step 520 is accomplished by passing the data to another node that is either the portal or one hop closer to the portal within the LAN. This may be accomplished, for instance, using a transceiver such as close range communication module 340 of FIG. 5.

If the event detected in step 505 is the receipt of data from the direction of the WAN, the method proceeds to step 535. At step 535, if there is data for more than one recipient, the data may be separated out (de-aggregated) for each recipient. Some data may be kept in an aggregated form if it is all destined for a single smart meter or network nodes subordinate to a single smart meter. At step 540, the data is forwarded to the appropriate recipients. The recipient of some or all of the data may be the smart meter that is performing the method. In this case, the smart meter retains and uses, rather than forwards, that portion of the data. After forwarding or consuming the data, the method returns to normal operation 490 and awaits another event.

If the event detected in step 505 is an event that indicates that a reorganization and election of a new portal may be necessary, the method proceeds to step 555. Events that may cause a reassessment of the organization of the network and an election of portal may include, but are not limited to, the current portal becoming unreachable, a change in one of the cost function parameters such as modulation and coding or signal quality, a new node entering the network, a node leaving the network, a power outage, the remaining charge in the battery of a battery operated device dropping below a threshold, or the receipt of an updated score from a neighboring node. At step 555, the smart meter recalculates its portal score, if necessary, and sends its score to its neighbors. This notifies the neighbor of an election triggering event in case they were unaware of the event directly. At step 560, the node participates in a portal reelection. In this regard, steps 555 and 560 are similar to or the same as steps 440 through 480 of FIG. 4. As with steps 475 and 480 in FIG. 4, after the election of a new portal, which may result in the reelection of the original portal or a different device to be portal, the method proceeds from step 560 back to normal operation 490 and awaits another event.

One skilled in the art would recognize that there are many events that may cause a new election of a portal. Meters may periodically give up the position of acting as a portal, thereby triggering a new election. The cost function may be augmented by a characteristic describing the length of time a meter has been acting as a portal, thereby giving lower scores to meters that have been portals longer. These may be especially important in networks of battery operated meters or solar powered meters in which the solar power is sufficient to act as a non-portal node while simultaneously recharging the battery, but in which transmitting as a portal drains the battery at a rate faster than it can recharge. In these cases, shifting portals allows a more balanced draining of batteries and allows solar powered meters to alternate recharging and draining their batteries.

In an aspect, smart nodes may be commanded to become portals. For instance a smart grid operator may want to distribute a software update or cost function weights or parameters to all, or a given number, of meters. In this case, many portals receiving and forwarding a multicast download of software or parameters may temporarily be preferable to minimizing the number of portals.

In an aspect, a smart meter capable of being a portal may calculate the cost function for being a portal and may also calculate a similar cost function for being a non-portal node. The cost function for being a non-portal node may include, for instance, delay due to multiple hops, availability of paths to multiple portals, signal strength to next nodes towards portals, etc. The meter may decide to become a portal, even if not elected, if the cost of being a non-portal is unfavorable relative to the cost of being a portal.

The foregoing systems and methods and associated devices and modules are susceptible to many variations. Additionally, for clarity and concision, many descriptions of the systems and methods have been simplified. For example, the figures generally illustrate one of each type of device (e.g., one access node), but a communication system may have many of each type of device. Similarly, many descriptions use terminology and structures of a specific wireless standard, such as for example LTE or IEEE 802.11. However, the disclosed systems and methods are more broadly applicable.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the claims.

What is claimed is:

1. A smart node in a local area network, the smart node comprising:
    a first transceiver configured to communicate with a plurality of other nodes in the local area network;
    a second transceiver configured to communicate with at least one access node in a wide area network; and
    a processor coupled to the first transceiver and the second transceiver and configured to:
        establish a connection with at least one neighboring node in the local area network via the first transceiver,
        determine a portal candidate score for the smart node by multiplying node characteristic values including a power characteristic of the smart node, a communications characteristic between the smart node and the access node in the wide area network, and the number of the other nodes that communicate with the smart node within a predetermined number of hops,
        determine, using the determined portal candidate score, if the smart node is acceptable to act as a portal between the local area network and the wide area network, and
        connect, in the case that the smart node is acceptable to act as a portal between the local area network and the wide area network, to the at least one access node in the wide area network via the second transceiver.

2. The smart node of claim 1, wherein the processor is further configured to send the portal candidate score to the at least one neighboring node in the local area network.

3. The smart node of claim 1, wherein the determination if the smart node is acceptable to act as a portal is based at least in part on a comparison of the portal candidate score to a threshold value.

4. The smart node of claim 1, wherein the determination if the smart node is acceptable to act as a portal is based at least in part on an indication received from one of the at least one neighboring node in the local area network.

5. The smart node of claim 1, wherein the communications characteristic of the smart node includes at least one of a wide area network capability value or a received signal strength value.

6. The smart node of claim 1, wherein the processor is further configured to receive a respective portal candidate score from one or more of the at least one neighboring node via the first transceiver, and wherein it is determined if the smart node is acceptable to act as a portal by comparing the portal candidate score of the smart node to each of the received portal candidate scores.

7. The smart node of claim 1, wherein the processor is further configured to:
    obtain a first data set for sending to the at least one access node in the wide area network, and
    send a data message to the at least one access node in the wide area network via the second transceiver, the data message being based at least in part on the first data set.

8. The smart node of claim 7, wherein the smart node further includes a measurement module, and wherein the first data set is obtained from the measurement module.

9. The smart node of claim 7, wherein the processor is further configured to receive, via the first transceiver, a second data set from at least one of the plurality of other nodes in the local area network, and wherein the first data set and the second data set are aggregated and included in the data message that is sent to the at least one access node.

10. The smart node of claim 1, wherein the processor is further configured to:

receive a command message from the at least one access node via the second transceiver,
determine one or more of the at least one neighboring node in the local area network that corresponds to a respective portion of the command message, and
send each respective portion of the command message to the corresponding neighboring node in the local area network via the first transceiver.

11. The smart node of claim 10, wherein the processor is further configured to obtain a portion of the command message that corresponds to the smart node.

12. The smart node of claim 1, wherein the processor is further configured to:
determine that a reorganization event has occurred,
determine an updated portal candidate score for the smart node based at least in part on a current value of the node characteristic value,
determine if the smart node is acceptable to act as a portal between the local area network and the wide area network,
connect, in the case that the smart node is acceptable to act as a portal between the local area network and the wide area network, to the at least one access node in the wide area network via the second transceiver, and
disconnect, in the case that the smart node is currently in connection with the at least one access node in the wide area network and the smart node is not acceptable to act as a portal between the local area network and the wide area network, from the at least one access node in the wide area network.

13. The smart node of claim 12, wherein the processor is further configured to send the updated portal candidate score to the at least one neighboring node in the local area network.

14. The smart node of claim 12, wherein the determination if the smart node is acceptable to act as a portal is based at least in part on a comparison of the updated portal candidate score to a threshold value.

15. The smart node of claim 12, wherein the determination if the smart node is acceptable to act as a portal is based at least in part on an indication received from one of the at least one neighboring node in the local area network.

16. The smart node of claim 12, wherein the reorganization event is based on a power level indication associated with a power source of the smart node.

17. The smart node of claim 12, wherein the reorganization event is based on at least one power level indication associated with one or more of the at least one neighboring node in the local area network.

18. The smart node of claim 12, wherein the reorganization event is based on at least one changed connection in the local area network.

19. The smart node of claim 12, wherein the reorganization event is based on a signal quality metric value.

20. The smart node of claim 12, wherein the reorganization event is based on receipt of a portal candidate score from one or more of the at least one neighboring node in the local area network.

21. The smart node of claim 12, wherein the reorganization event is based on a time duration that the smart node has been acting as a portal between the local area network and the wide area network.

22. A method for operating a smart node in a local area network, the method comprising:
establishing a connection between the smart node and at least one neighboring node of a plurality of other nodes in the local area network via a first transceiver module in the smart node;
determining a portal candidate score for the smart node by multiplying node characteristic values including a power characteristic of the smart node, a communications characteristic between the smart node and an access node of a wide area network, and the number of the other nodes that established connection with the smart node within a predetermined number of hops;
determining, using the determined portal candidate score, if the smart node is acceptable to act as a portal between the local area network and the wide area network; and
connecting, in the case that the smart node is acceptable to act as a portal between the local area network and the wide area network, to the access node in the wide area network via a second transceiver module in the smart node.

23. The method of claim 22, further comprising sending the portal candidate score to the at least one neighboring node in the local area network.

24. The method of claim 22, wherein determining if the smart node is acceptable to act as a portal is based at least in part on a comparison of the portal candidate score to a threshold value.

25. The method of claim 22, wherein determining if the smart node is acceptable to act as a portal is based at least in part on an indication received from one of the at least one neighboring node in the local area network.

26. The method of claim 22, wherein the communications characteristic value includes at least one of a wide area network capability value, a signal strength value or a received signal strength value.

27. The method of claim 22, further comprising receiving a respective portal candidate score from one or more of the at least one neighboring node via the first transceiver module, and wherein determining if the smart node is acceptable to act as a portal is based at least in part on comparing the portal candidate score of the smart node to each of the received portal candidate scores.

28. The method of claim 22, further comprising:
obtaining a first data set for sending to the at least one access node in the wide area network; and
sending a data message to the at least one access node in the wide area network via the second transceiver module, the data message being based at least in part on the first data set.

29. The method of claim 28, wherein the smart node includes a measurement module, and wherein the first data set is obtained from the measurement module.

30. The method of claim 28, further comprising receiving, via the first transceiver module, a second data set from at least one of the plurality of nodes in the local area network, aggregating the first data set and the second data set, and including the aggregated first data set and second data set in the data message.

31. The method of claim 22, further comprising:
receiving a command message from the at least one access node via the second transceiver module;
determining one or more of the at least one neighboring node in the local area network that corresponds to a respective portion of the command message; and
sending each respective portion of the command message to the corresponding neighboring node in the local area network via the first transceiver module.

32. The method of claim 31, further comprising obtaining a portion of the command message that corresponds to the smart node.

33. The method of claim 22, further comprising:
determining that a reorganization event has occurred;
determining an updated portal candidate score for the smart node based at least in part on a current value of the node characteristic value;
determining if the smart node is acceptable to act as a portal between the local area network and the wide area network;
connecting, in the case that the smart node is acceptable to act as a portal between the local area network and the wide area network, to the at least one access node in the wide area network via the second transceiver module; and
disconnecting, in the case that the smart node is currently in connection with the at least one access node in the wide area network and the smart node is not acceptable to act as a portal between the local area network and the wide area network, from the at least one access node in the wide area network.

34. The method of claim 33, further comprising sending the updated portal candidate score to the at least one neighboring node in the local area network.

35. The method of claim 33, wherein determining if the smart node is acceptable to act as a portal is based at least in part on a comparison of the updated portal candidate score to a threshold value.

36. The method of claim 33, wherein determining if the smart node is acceptable to act as a portal is based at least in part on an indication received from one of the at least one neighboring node in the local area network.

37. The method of claim 33, wherein the reorganization event is based on a power level indication associated with a power source of the smart node.

38. The method of claim 33, wherein the reorganization event is based on at least one power level indication associated with one or more of the at least one neighboring node in the local area network.

39. The method of claim 33, wherein the reorganization event is based on at least one changed connection in the local area network.

40. The method of claim 33, wherein the reorganization event is based on a signal quality metric value.

41. The method of claim 33, wherein the reorganization event is based on receipt of a portal candidate score from one or more of the at least one neighboring node in the local area network.

42. The method of claim 33, wherein the reorganization event is based on a time duration that the smart node has been acting as a portal between the local area network and the wide area network.

* * * * *